United States Patent Office 3,235,729
Patented Feb. 15, 1966

3,235,729
DENSITY LOGGING OF BORE-HOLES
UTILIZING GAMMA RAYS
Serge A. Scherbatskoy, 1220 E. 21st Place, Tulsa, Okla.
Original application Dec. 13, 1957, Ser. No. 702,630.
Divided and this application Jan. 13, 1961, Ser. No. 82,578
1 Claim. (Cl. 250—83.3)

This invention relates to the study of earth formations, and more particularly to the logging of sub-surface formations traversed by a well or bore hole.

This application is a division of my copending application Serial No. 702,630, filed December 13, 1957, now abandoned, for Gamma-Ray Testing.

An important object of this invention is the provision of a method and an apparatus for making a nuclear bore-hole log which will not be influenced by nor contain inaccuracies due to variations in the diameter of the bore hole or due to variations in the well casing position within the bore hole.

A further object of this invention is to provide in well logging a signal indicating the density of the medium in the immediate neighborhood of the exploring instrument and to utilize this signal in order to eliminate the inaccuracies due to the variations in the diameter of the bore hole or due to variations in the well casing positions within the bore hole.

Another object of this invention is to provide a log of the density of formations traversed by the bore hole.

Another object of this invention is to provide a measurement indicating the degree of eccentricity of the sub-surface instrument within the bore hole.

It is now well recognized that when a source of neutrons is passed through a bore hole so that the neutrons pass outwardly from the source into the surrounding formations, a measurement of the gamma rays induced in the formations by the neutron bombardment or a measurement of the neutrons that have been slowed down in the surrounding formations and reached thermal or epithermal energies provides information as to the porosities of the formations traversed. When a formation is sufficiently porous to contain water or oil in its pore spaces, more or less of the neutrons will be absorbed in this hydrogen-containing formation and a detector of gamma rays or a detector of thermal or epithermal neutrons passed through the hole in the vicinity of the source will respond to varying intensities of induced gamma rays or of thermal or epithermal neutrons. A record or log of these intensities, when correlated with the depths of the measurements in the hole, will indicate the relative hydrogen contents and, consequently, the porosities of the formations. It has recently been recognized that the conventional neutron-gamma ray log or neutron-neutron log referred to above does not always provide true indications of the porosities, this being due to the fact that the detector response will be affected by variations in the diameter of the hole. Thus, if a portion of the formation walls has caved in so that the hole is larger in diameter at that depth than it is at other depths, there will be a larger amount of drilling mud or well fluid surrounding the measuring instrument. Since this well fluid contains hydrogen, many of the neutrons will be absorbed therein and the resulting log, which would appear to indicate a zone of high porosity at that depth, will be in error. In open holes, the logging instrument usually hangs so that it rests against the side wall and actually one side of the instrument is in contact with the rocks that are being surveyed. As the instrument traverses a cavity or enlargement, the instrument hangs free and is surrounded by well fluid on all sides which affects substantially the response to the radiations from the formations.

In cased wells, the logging instrument also usually hangs so that it is against one side of the casing and is in contact with the casing along a line of contact. The casing is, however, not always concentric within the bore hole, but frequently is in contact with the bore-hole wall along a line of contact on one side. The line of contact of the casing with the well wall is, however, not the same as the line of contact of the instrument with the casing, and therefore big differences are sometimes introduced in the distance between the instrument and the well wall. For example, if the line of contact of the instrument with the casing coincides with the line of contact of the casing with the well wall, then the distance between the instrument and the well wall is small. If the line of contact of the instrument with the casing is 180° removed from the line of contact of the casing with the well wall, then of course, the distance between the instrument and the well wall is very much greater. As a survey progresses, the line of contact of the instrument with the casing can have any position with respect to the line of contact of the casing with the well wall, and therefore large and uncontrollable variations in the distance between the instrument and the well wall occur. In addition to the effect of cavings and consequent enlargements of the bore hole, the above effect must therefore be corrected for.

In accordance with one of the aspects of my invention, I provide a signal representing the variation of the diameter of the well or the variations in the distance between the instrument and the side wall of the well, and by means of this signal I control the effective output of the radiation detector so as to correct the log.

For a better understanding of the invention, reference may be had to the accompanying drawing, in which.

Figure 5:
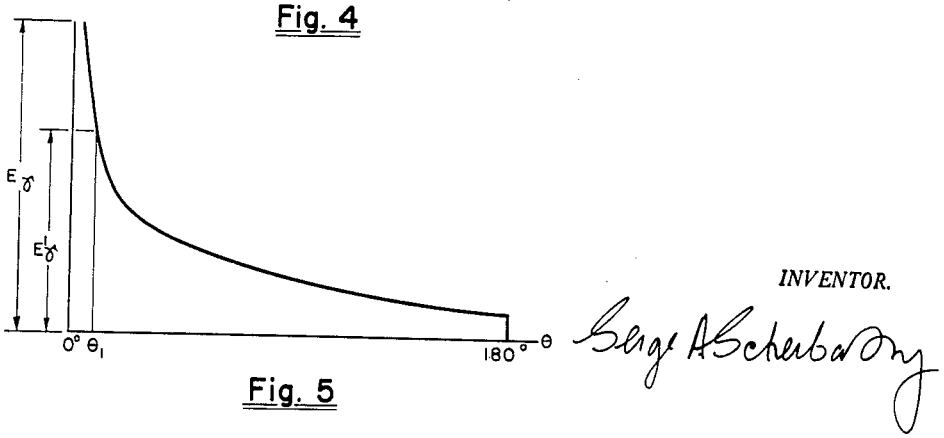

FIG. 5 shows another effect of Compton scattering corresponding to an incident monochromatic photon beam collimated along a definite direction and interacting with electrons in a given medium. The abscissas in FIG. 5 represent the angle of the scattered photon with respect to the incident photon, and the ordinates represent the relative abundance of the photons scattered along the angle represented by said direction.

Figure 6:
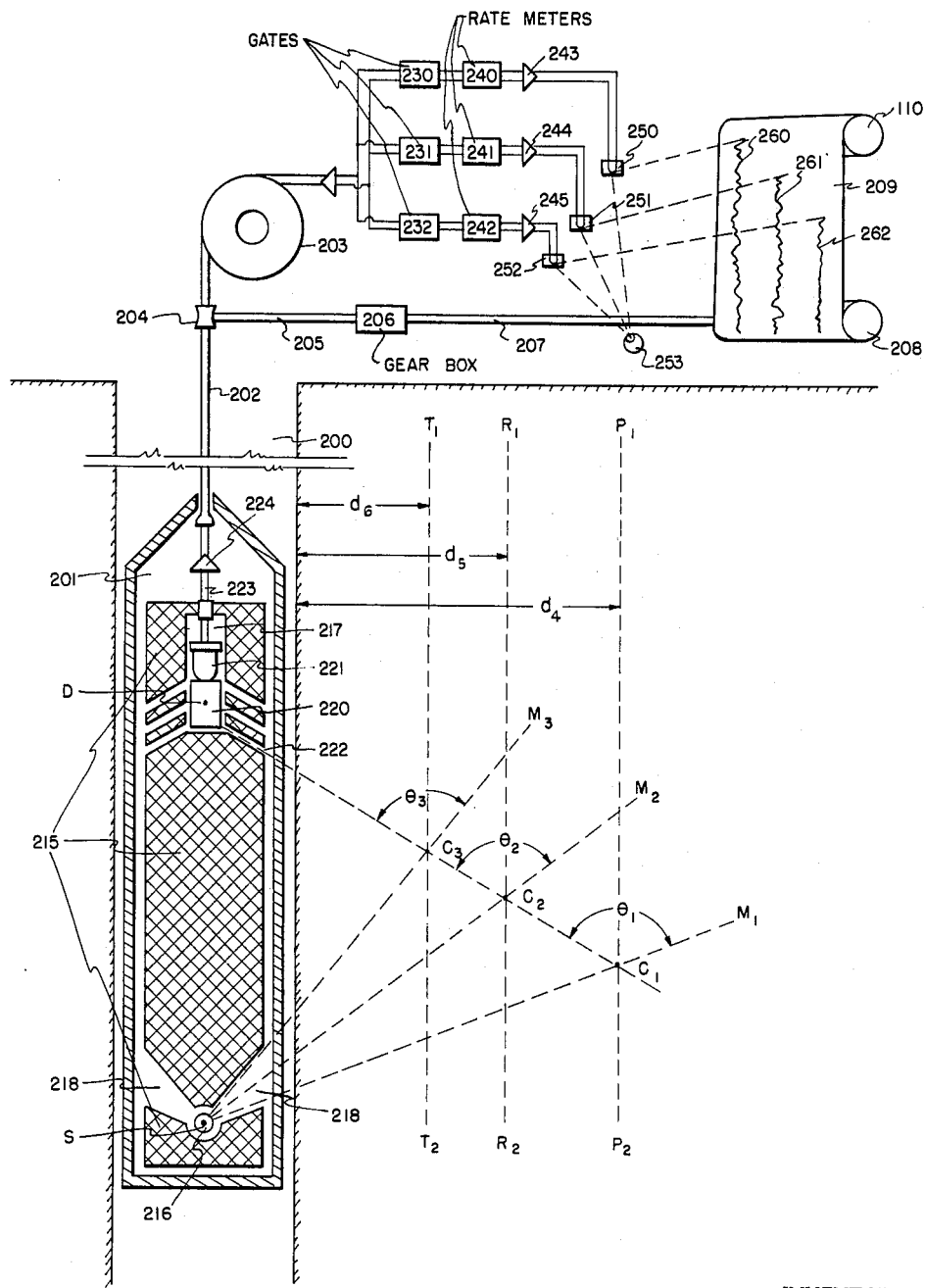

FIG. 6 shows a well-logging system for producing logs representing the formations at various lateral distances from the bore hole.

Figure 6B:
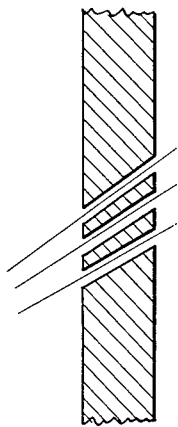
Figure 6C:
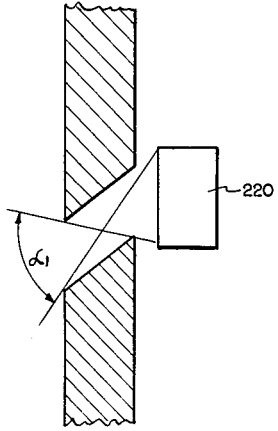
Figure 6A:
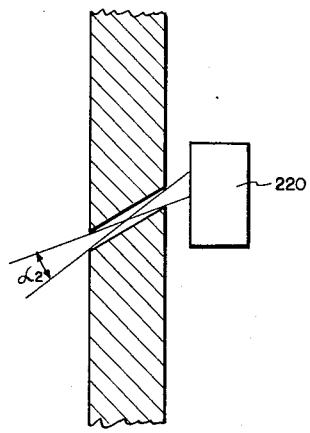

FIGS 6a, 6b, and 6c are fragmentary sectional views showing various arrangements for achieving directional response in the apparatus of FIG. 6.

Figure 7:
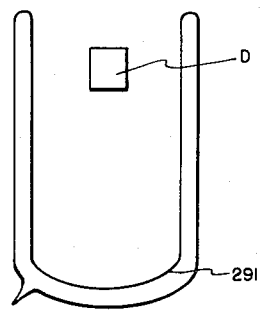

FIG. 7 is a diagrammatic fragmentary view showing an arrangement wherein a radiation detector is enclosed in a Dewar flask to protect it against excessive temperatures.

Figure 8A:
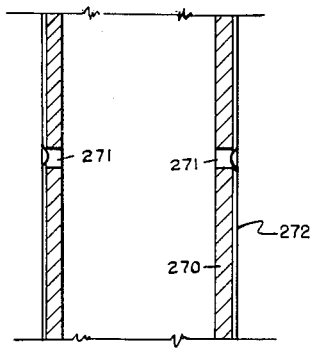
Figure 8:
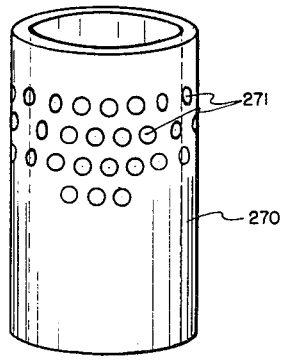

FIGS. 8 and 8a are fragmentary views showing an arrangement for obtaining directional response of a radiation detector in applications wherein the apparatus is exposed to very high external pressures.

Consider now FIGS. 1, 1a, 1b, and 2. For the purpose of exploring the formations along the bore hole there is provided in accordance with the present invention exploratory apparatus comprising a housing 10 which is lowered into the bore hole by means of a cable 11. The cable has a length somewhat in excess of the depth of the bore hole to be explored and is normally wound on a drum 12 to lower the exploring apparatus into the bore hole and may be re-wound upon the drum 12 to raise the exploring apparatus.

In order to determine the depth of the exploratory apparatus within the bore hole 13 at any time, there is provided a measuring wheel 14 engaging the cable 11 above the top of the bore hole and adjusted to roll on the cable in such a manner that the number of revolutions of the reel 14 corresponds to the amount of cable which has moved past the reel in either direction. The reel 14 is mounted on a shaft 15 and rotation of the reel 14, and consequently of the shaft 15, is transmitted through a gear box 16 to another shaft 17 which is drivingly connected to the take-up spool 18 for moving photographic film 19 from a feed spool 20 to the take-up spool 18.

Figure 1:
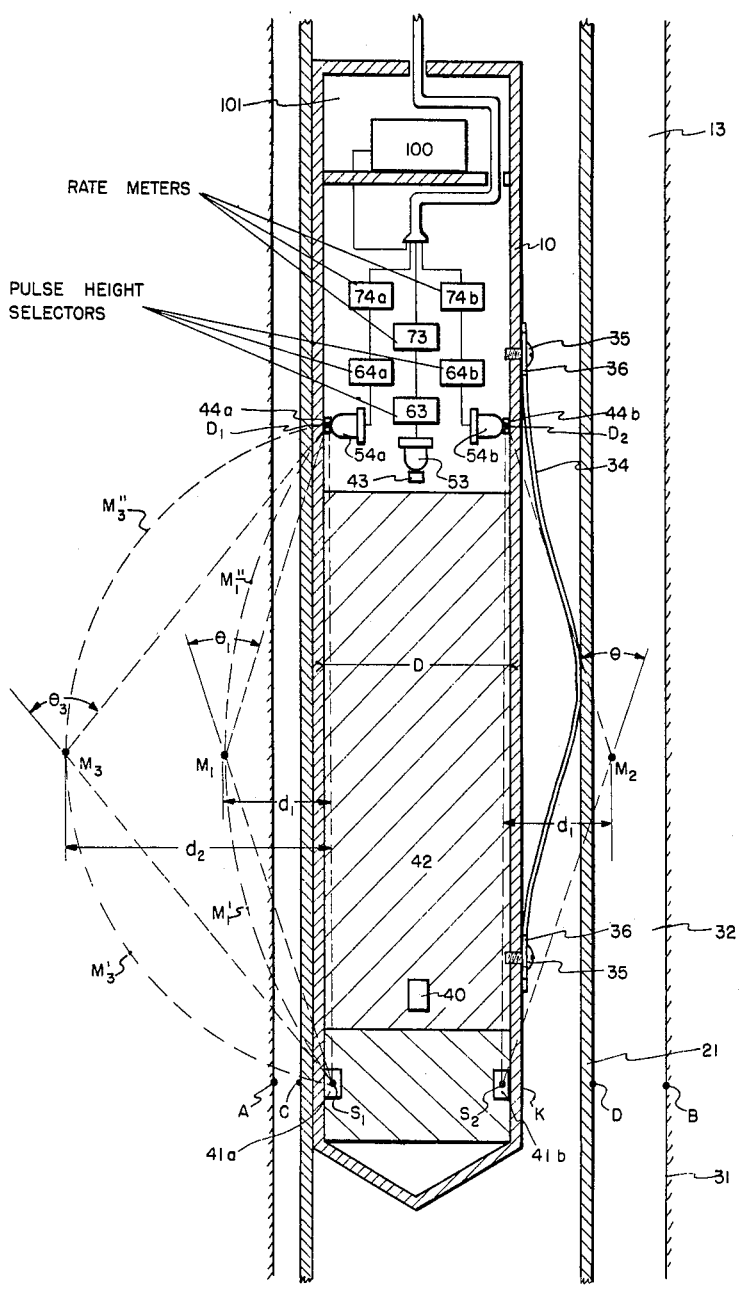
FIG. 1 shows a sub-surface instrument comprising a conventional system for neutron logging, thereby providing a signal indicating the hydrogen content of the surrounding formations and comprising an additional system for density logging, thereby providing signals representing the density of the medium adjacent said sub-surface instrument.

As shown in FIG. 1, the bore hole 13 is provided with a steel casing 21, said casing having a diameter that is substantially smaller than the diameter of the bore hole. The casing 21 is shown as traversing subsurface formations surrounding the bore hole. It will be noted that the walls of the bore hole within the formation have caved or been enlarged, or, in other words, that the diameter of the bore hole within the formation is larger than the diameter of the casing. Let CD designate the diameter of the casing and AB the corresponding diameter of the hole. As it is apparent from the cross-sectional view in FIG. 2, the casing 21 and the well wall form two eccentric circles, one within the other. Therefore, the cylinder forming the casing 21 is located eccentrically within the cylinder 31 defining the walls of the bore. The axes of these two cylinders are parallel to each other and the space 32 that is bounded on one side by the wall 31 of the bore and on the other side by the external surface of the casing 21 is usually filled with water or drilling fluid. Furthermore, as shown in FIG. 2, the sub-surface housing 10 and the casing 21 form two cylinders having their axes aligned along the vertical said sub-surface, housing 10 being eccentrically positioned within the casing 21, and the space between said cylinders being filled with drilling fluid or water.

It is thus apparent that cylinder 10 defines the subsurface housing and the cylinder 31 defines the wall of the bore hole having their axes aligned along the vertical, said cylinder 10 being eccentrically positioned within said cylinder 31. Since the space between the surface of the cylinder 10 and the surface of the cylinder 31 is filled with fluids containing a substantial amount of water, the resulting neutron log is very sensitive to the difference between the diameter CK of the housing 10 and the diameter AB of the bore hole. Furthermore, the neutron log is very sensitive to the degree of eccentricity between the casing 21 and well bore 31. In accordance with my invention I provide an index of distance AC and the distance KB, said two distances defining the degree of eccentricity between the two cylinders and also the difference in diameters between said cylinders. In one embodiment of my invention I provide a separate record of said index, and in another embodiment I utilize said index to correct the inaccuracy in a neutron log, said inaccuracy being due to the difference in diameter and to the eccentricity between said two cylinders.

A positioning device is provided for maintaining one side of the housing 10 pressed flush against one side of the casing wall 21 as shown, and takes the form of spaced arcuate steel spring strips 34 disposed about a portion of the periphery of the casing 21 with each having its upper end securely fastened to the casing 21 by a headed bolt 35 threaded into the casing 21. Each spring strip 34 is provided with a longitudinally extending slot 36 adjacent its lower end, and is secured to the casing 21 by means of a headed bolt 37 that extends through the slot 36 and is threaded into the casing 21. The shank portion of the bolt 21 is slidable within the slot 36, and the arrangement is such that the spring strips 34 yieldingly urge the opposite side of the casing 21 into engagement with the casing wall 21. The flexibility of the spring strips 34 and the lost-motion connection between their lower end portions and the housing 10 maintain the housing 21 in contact with the casing wall.

Figure 2:
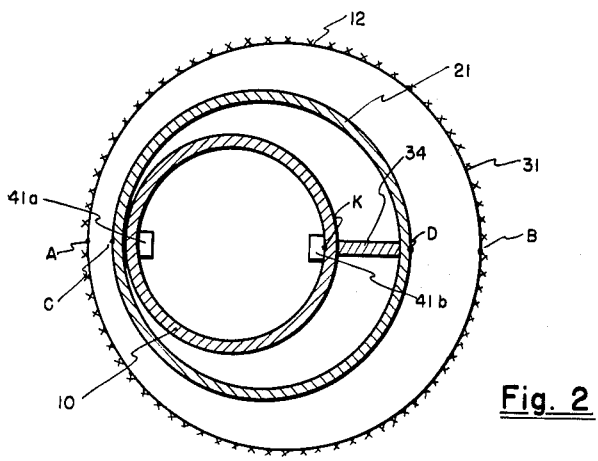
FIG. 2 shows the cross-sectional view of the arrangement of FIG. 1, the plane of the cross section being indicated in FIG. 1 by the line AB.
Figure 3:
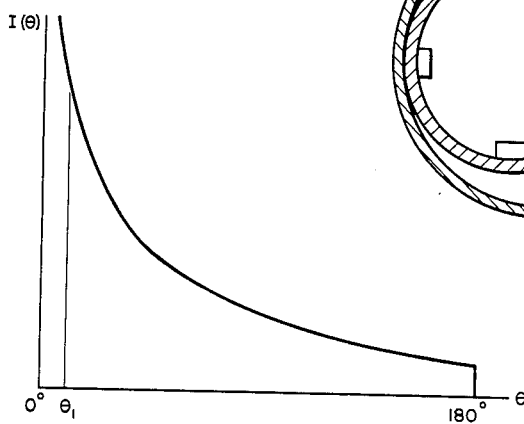
FIG. 3 shows a modified cross-sectional view of a modified sub-surface system using a gamma-ray emitter.

The housing of the exploratory apparatus contains a source of neutrons 40 which may be the standard Ra:Be preparation, and two sources of gamma rays designated as 41a, 41b, and arranged peripherally within the instrument housing in a manner indicated in FIG. 2. All these sources are imbedded in a material 42 which is a very efficient neutron moderator and neutron absorber, and also a very efficient absorber of gamma radiation. Such a substance may, for instance, consist of cement mixed with boron for attenuating neutrons, and in which there is also incorporated a material of very high density such as tungsten for attenuating gamma rays.

Within the housing 10 and above the shielding substance 42 is positioned a centrally located crystal 43 and two crystals 44a and 44b arranged on the periphery of the inside wall of the housing 10.

The crystals 43, 44a, and 44b may be of anthracene, sodium iodide, lithium iodide, or any other substance that is adapted to translate any incoming radiations such as gamma rays into impulses of light. These impulses of light subsequently impinge upon the photomultipliers and we obtain across the output terminals of the photomultipliers current impulses representing the energies of the corresponding radiation quanta. As shown in FIG. 1, the photomultipliers 53, 54a, 54b cooperate with the crystals 43, 44a, 44b, respectively. The outputs of the photomultipliers 54a and 54b are connected to pulse height selectors 64a and 64b, which are characterized by a definite pass band and are adapted to transmit only those impulses that fall within a certain amplitude range. The amplitude range passed by pulse height selectors 64a, 64b is lower than the maximum value of the impulses obtained in the output of the photomultipliers 54a, 54b. Therefore, these two pulse height selectors are adapted to transmit a comparatively narrow range of impulses in the neighborhood of a value corresponding to relatively low energy gamma rays. Pulse height selector 63 is adapted to transmit a range of impulses in the neighborhood of a value corresponding to relatively high energy gamma rays. The outputs of the pulse height selectors 63, 64a, 64b are respectively connected to rate meters 73, 74a, 74b, each of said rate meters being adapted to produce across its output terminals a D.-C. voltage representing the frequency of occurrence of impulses applied across its input terminals. Thus we obtain across the output terminals of the meter 73 a D.-C. voltage representing the frequency of arrival of those photons that are detected by the crystal 43 and that correspond to relatively high energy gamma rays of energy greater than approximately 2 m.e.v. Similarly, we obtain across the output terminals of the meters 74a, 74b D.-C. voltages representing the frequency of arrival of those photons that are detected by the crystals 44a and 44b, respectively, and that have a relatively low energy and of energy lower than approximately 2 m.e.v.

The portion of the exploring system comprising the neutron source 40, shield 42, the crystal 43, and photomultiplier 53 associated with the crystal forms part of the neutron-gamma well-logging arrangement. In this arrangement the neutrons emitted by the source 40 bombard the surrounding formation, and as a result of interaction with various elements contained in said formation, the incident neutrons are slowed down and captured. These capture processes are accompanied by the emission of photons and the energy of each emitted photon depends upon the character of the capturing element. Usually the gamma rays of capture are within the range from 5 m.e.v. to 10 m.e.v. the only exception being those gamma rays that are emitted upon the capture of hydrogen. These latter gamma rays have an energy of 2.3 m.e.v. It should be noted that these gamma rays due to capture of various elements in the formations have energies almost always higher than 2 m.e.v. Let M designate the magnitude of impulses produced by the photomultiplier 63 corresponding to the energy of 2 m.e.v.

The pulse height selector 63 connected to the output of the photomultiplier 53 is adapted to transmit selectively only those impulses that are above the magnitude M and selectively attenuate other impulses. These impulses above the value M actuate the rate meter 73. We obtain therefore across the output terminals of the network 73 a D.-C. voltage having a magnitude representing the rate of occurrence of impulses applied to its input terminals. It is well known that this rate of occurrence of impulses depends upon the diameter of the bore hole and to the eccentric relationship between the instrument housing and the bore hole. The larger is the diameter of the bore hole in the immediate neighborhood of the source 40 and of the detector 43, the lower is the rate of occurence of impulses, and the smaller is the voltage output of rate meter 73.

The output of the rate meter 73 is transmitted by means of the cable 11 to the top of the drill hole. As shown more specifically in FIG. 1a, this output derived from the leads 83 actuates a galvanometer mirror 84 that co-operates with a source of light 85 in order to produce on a movable strip 19 a trace 86 representing the variation of the output of the meter 73 with the depth of the hole.

The operation of this arrangement can be easily understood considering the fact that the output of the rate meter 73 shown on the trace 86 which normally should indicate porosity or water content is also sensitive to the diameter of the hole in the immediate neighborhood of the housing 10, and to the relative position of said housing with respect to said hole. Under normal operating conditions, i.e., when the diameter of the hole is the same for all the depths, a decrease in the output of the rate meter 73 would indicate the increase in porosity or water content of the rock, and conversely the increase in the output of the rate meter 73 would indicate the decrease in porosity or water content. On the other hand, if the diameter of the hole increases, the output of the rate meter 73 would decrease even if the porosity of the adjoining formation would remain the same, and conversely, if the diameter of the hole decreases, the output of the rate meter 73 would increase even if the porosity of the adjoining formation would remain the same.

Figure 1A:
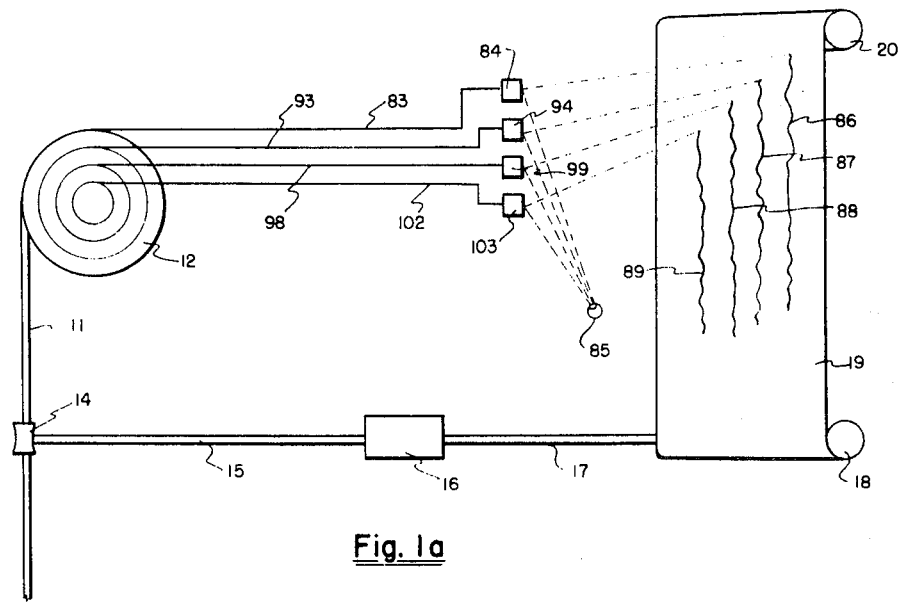
FIG. 1a shows a surface recording system for producing separate records of hydrogen content, and of the density of the medium adjacent the sub-surface instrument.

Therefore, the log represented by the trace 86 does not provide an accurate representation of the porosity of the formation. The information provided by this log is influenced not only by the porosity of the formation penetrated by the hole, but also by the relative position of the exploring housing 10 with respect to the wall 31 of the bore hole. This relative position and the variation of said position with respect to the depth of the hole is represented in the record of FIG. 1a in form of three traces designated respectively by 87, 88, and 89. The traces 87 and 88 show the eccentricity of the wall of the housing 10 with respect to the wall 31 of the bore hole and the trace 89 represents the eccentricity of the housing 10 with respect to geographic north.

Referring now to FIG. 2, it is seen that the position of the housing 10 with respect to the wall 31 of the bore hole can be ascertained by providing a significant information relating to the layer AC in the immediate neighborhood of the gamma ray source 41a and the layer $KB=KD+DB$ in the immediate neighborhood of the source 41b. It is apparent that both layers are filled with water and there is a definite distinction between the physical character of water and of the earth formations such as sand, shale, etc. Namely, the average specific gravity of the earth formation is within the range from 2 to 3 grams per cm.$^3$. Therefore, by providing an indication of the density of the medium in the immediate neighborhood of the source 41a or 41b, I am able to ascertain whether or not said medium contains a substantial portion of water. For instance, the portion of the casing 10 adjacent the source 41a is relatively close to the wall 32 of the bore, and the distance AC between the wall of the housing 10 and the wall of the bore hole 32 is relatively small. Therefore, the average density of the medium in the immediate neighborhood of the source 41a is very little influenced by the water in the layer $AS_1$ and mostly influenced by the density of the formation behind the wall 31. Consequently, the density of the medium in the immediate neighborhood of the source 41a is relatively high and I provide an index of this density for various well depths by means of the trace 87 in FIG. 1a. On the other hand, the portion of the housing 10 adjacent the source 41b is relatively distant from the wall 32 of the bore hole since the distance $S_2B$ between the wall of the casing and the wall of the bore hole is relatively large. Therefore, the average density of the medium in the immediate neighborhood of the source 41b is very much influenced by the water in the layer $S_2B$. Therefore, the density of the medium in the immediate neighborhood of the source in 41b is relatively low, and I provide an index of said density for various depths of the hole by means of the trace 88 in FIG. 1b.

A particularly important feature of this invention consists in the provision of a means for producing two density logs represented by traces 87 and 88 in FIG. 1a. One of said logs, i.e., the trace 87, is produced by means of source 41a emitting gamma rays that are subsequently scattered by the formation and detected by means of a crystal 44a working in conjunction with a photomultiplier 54a. The other log is produced by means of source 41b and a crystal 44b, cooperating with the photomultiplier 54b for detecting gamma radiation scattered by the formation and originating from the source 41b. The radiation sources 41a and 41b are identical one to the other and they are positioned against the walls of the housing 10 in a manner shown in FIG. 1 and FIG 2. Each of these sources emits a substantially monochromatic beam of gamma rays such as, for instance, $K^{42}$ emitting gamma rays having 1.51 m.e.v. or $O_s^{193}$ emitting gamma rays of 1.2 m.e.v. or $Z_n^{65}$ emitting gamma rays of 1.11 m.e.v. In the following description, I use as an example for the source, $C_o^{60}$ emitting gamma rays having energy of about 1.2 m.e.v.

Let $E\gamma$ designate the energy of gamma rays emitted by the monochromatic source 41a or 41b. These gamma rays interact with electrons in the adjoining formation and undergo Compton scattering. At each of such Compton encounters the scattered secondary gamma ray deviates by an angle $\theta$ from the original direction of the incident gamma ray, and furthermore, there is a degradation of energy, i.e., the energy of the scattered ray $E^1\gamma$ is smaller than the energy $E\gamma$ of the incident gamma ray.

Consider now photons emitted by the source 41a. Both photons have energy $E\gamma$. These photons undergo Compton scatterings at the points $M_1$ and $M_3$, respectively. The photon scattered at the point $M_1$ has a scattering angle $\theta_1$ and energy $E^1\gamma$ and the photon scattered by the point $M_3$ has a scattering angle $\theta_3$ and corresponding energy $E^1\gamma$. FIG. 5 shows a relationship between the scattering angle and the value of the energy of scattered photons. As shown in this figure, the energy of the scattered photon differs very little from the energy of the incident photons if the scattering angle is small, but, on the other hand, the energy of the scattered photon decreases very rapidly for a large angle of scattering. Since the value $\theta_1$ is relatively small, the photon scattered at the point $M_1$ has an energy somewhat smaller than the incident photon, but does not differ substantially in energy from the incident photon. On the other hand, the scattering at the point $M_3$ produces a photon having a large value of $\theta_3$ and therefore the scattered photon is considerably smaller than the incident photon.

Consider now a vertical line $S_1D_1$ close to the wall of the housing and passing through the points $S_1$ and $D_1$. Let $d_1$ designate the distance from the scattering point $M_1$ to the line $S_1D_1$ and let $d_2$ designate the distance from the scattering point $M_3$ to the line $S_1D_1$. It is apparent that the points M, $M_1'$, $M_1''$, etc., characterized by the scattering angle $\theta_1$ are located on an arc of a circle, and the value $d_1$ is the maximum distance of these points from the line $S_1D_1$. Referring now to FIG. 5, it is apparent that to the scattering angle of value $\theta_1$ corresponds a scattered photon having a value $E^1\gamma$. Therefore, all photons scattered at points such as $M_1$, $M_1'$, $M_1''$, etc., that are located on said arc have energy $E^1\gamma$. Furthermore, all scattering points such as $M_4$ or $M_5$ that are located within the arc correspond to angles larger than $\theta$ and energies smaller than $E^1\gamma$.

Referring now again to FIG. 1, it should be noted that the pulse height selector 64a applied across the terminals of the photomultiplier 54a is adapted to transmit impulses having magnitudes within two thresholds, the lower threshold corresponding to the energy $E^1\gamma$, and the upper threshold corresponding to the energy $E\gamma$. Therefore, the D.-C. voltage obtained across the output terminals of the frequency meter 74a represents the rate of occurrence of Compton scatterings that occured within the arch $S_1$, $M_1'$, $M_1$, $M_1''$, $D_1$ and the chord $S_1D_1$, i.e., within the distances from $S_1D_1$ that are smaller than $d_1$. On the other hand, it is well known that the number of scatterings within a given region of space is proportional to the electron density within said region. Therefore, the voltage obtained across the output terminals of the frequency meter 74a represents the average density of material located within distances $d_1$ from the wall of the casing adjacent the source $S_1$ and detector $D_1$.

Figure 4:
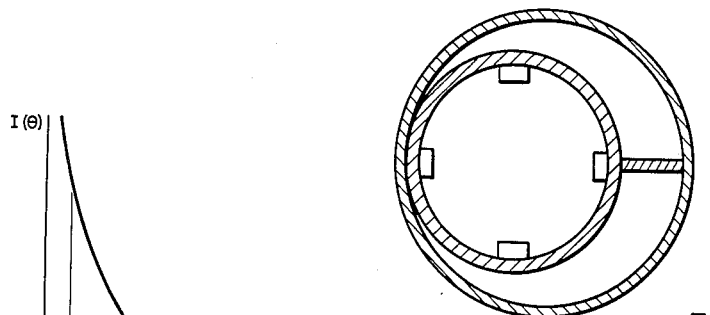
FIG. 4 illustrates the effect of Compton scattering corresponding to an incident monochromatic photon beam collimated along a definite direction and interacting with electrons in a given medium. The abscissas in FIG. 4 represent the angle of the scattered photon with reference to the incident photon, and the ordinates represent the corresponding energy of the scattered photon.

Referring now to FIG. 4, it is seen that the photons represented by scattering angles between zero and a relatively small value $\theta_1$ are much more abundant than photons represented by larger scattering angles. Therefore, in some instances it might not be necessary to provide across the output of the photomultiplier 54a the gate network 64a and in such instance we apply directly the output of the photomultiplier to the frequency meter 74a. It should be recognized, however, that the presence of the gate network 64a constitutes a very valuable improvement since this network cuts out completely photon energies lower than $E^1\gamma$ and therefore the output of the rate meter 74a represents only those formations that are at distances smaller than $d_1$.

The output of the meter 74a is applied through the cable 11, leads 93, to the galvanometer mirror 94 to produce a trace 87 representing the distance AC.

We shall now apply the same considerations to the photons emitted by the source 41b that are scattered by the formations and detected by means of the crystal 44b. The photomultiplier 54b cooperating with the crystal 44b, the gate network 64b, and rate meter 74b are respectively identical to corresponding elements designated by numerals 54a, 64a, and 74a. Therefore, we obtain across the output terminals of the rate meter 74b a voltage representing the density of formations located within the range of distances extending from zero to the value $d_1$ as measured from the line $S_2D_2$ that is substantially coincident with the wall of the casing adjacent the source $S_2$ and detector $D_2$. As an illustration, FIG. 1 shows a gamma-ray scattering that occurs at a point $M_2$ at a distance $d_1$ from the line $S_2D_2$.

The output of the meter 74b is applied through the cable 11, leads 98, to the galvanometer mirror 99 to produce a trace 88 representing the distance $KB = KD + DB$.

Let the distance CK which represents the diameter of the housing 10 be represented as D. An important feature of this invention is that $d_1$ is arranged to be less than D and preferably less than D/2. Therefore, if the photons emitted by the source 41b and scattered by the formation arrived at the detector 54a, the scattering angle exceeds the value $\theta_1$ and therefore the energy of the scattered photons is below the value $E^1\gamma$. Consequently, such a photon produces an impulse that is not transmitted through the gate network 64a. It is thus apparent that in this arrangement the scattered photons originated by the source $S_2$ do not effect the output of the frequency meter 74, and conversely, the scattered photons originated by the source 41a do not affect the output of the rate meter 74b.

It is further apparent that the voltage across the rate meter 74a indicates the density of the medium outside of the casing and adjacent the wall in the neighborhood of the source 41a. Furthermore, this voltage represents the density of the portion of the medium within distances extending from zero to $d_1$. Similarly, the voltage across the rate meter 74b indicates the density of the medium outside of the casing and adjacent the wall of the casing in the neighborhood of the source 41b. Furthermore, this voltage represents the density of the portion of the medium within distances extending from zero to $d_1$.

Referring now again to FIG. 2, it is seen that the casing 21 is eccentrically positioned with the walls 31 of the bore and it is the purpose of this invention to get an indication of the eccentricity and also of the size of the bore hole as compared to the cross-sectional dimensions of the housing 10.

In neutron well logging there is an importance source of inaccuracies due to the variations in distance of the instrument from the well wall. The most desirable system of logging would be one as shown in FIG. 1 where the line of contact of the instrument with the casing and the line of contact of the casing with the well wall coincide.

We obtain then the necessary information regarding the position of the casing with respect to the wall of the bore hole and the size of the bore hole by producing two signals, one of which represents the density of the medium outside of the casing and in the neighborhood of the line of contact of the instrument with the casing and other signal representing the density of the medium outside of the portion of the casing wall that is opposite to said line of contact and therefore is the most distant from the casing of the bore hole.

It is possible to insure that situation by means of a spring arangement as shown in FIG. 1. The purpose of the spring in FIG. 1 is not to keep the instrument against the casing since the instrument usually rests against the casing when hanging in the well, but to keep the instrument oriented in such a manner that the source 41a is always against the casing.

It is sometimes desired to record the eccentricity of the casing with respect to geographic north. This can be done in various ways, such as by the use of a gyroscope and angle transmitting device 100 in the compartment 101 of the housing, said gyroscope to serve as a directional reference and arranged to transmit to the surface of the ground an indication of the angular position of the housing 10 around its axis. Such indication can be, for example, with respect to true north and would be transmitted to the surface by cable 11 and lead 102, by methods well known in the art of directional gyros, and indicated by the mirror 103 on trace 89.

It is thus apparent that I have provided on the moving strip shown in FIG 1a four traces as follows: The trace 86 represents the output of the rate meter 73a, said output being functionally related to the porosity of the formation and to the position of the housing 10 with reference to the walls 32 of the bore hole; the trace 87 representing the output of the rate meter 74a, said output being fuctionally related to the distance SA, i.e., the smallest distance between the wall of the housing 10 and bore hole wall 32; the trace 88 representing the output of the rate meter 74b, said output being functionally related to the distance KB, i.e., the largest distance between the wall of the housing 10 and bore hole wall 32; and the trace 89 representing the orientation of the line $S_1S_2$ with respect to the north.

Figure 1B:
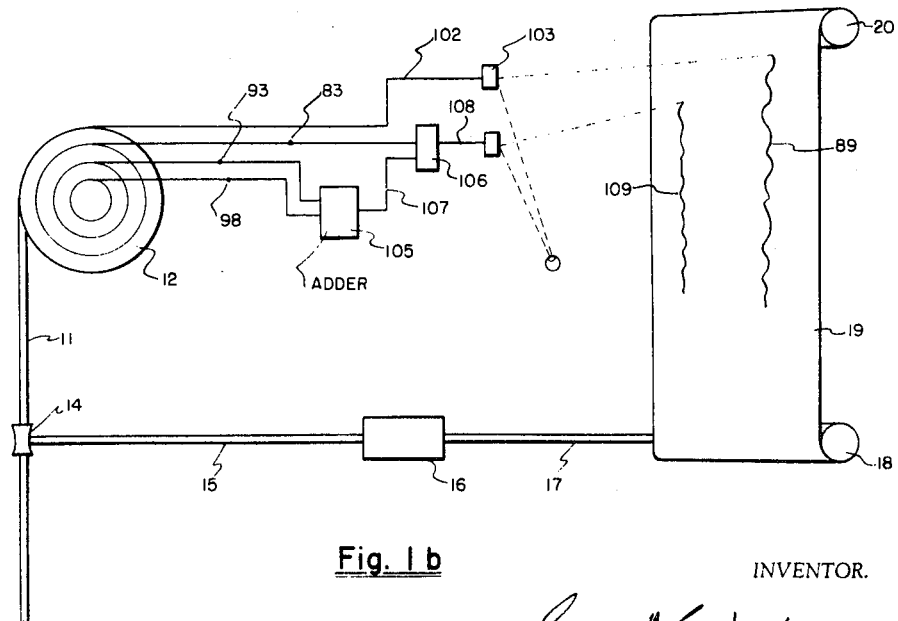
FIG. 1b shows a modified version of surface recording in which the signal indicating the density of the medium is used to correct the signal provided by the neutron log.

FIG 1b shows a modified embodiment of the surface instrument. As in FIG 1a, I show pairs of leads by a single line. This is for simplicity of illustration. As shown in FIG. 1b, the leads 93 and 98 representing the output of the rate meters 74a and and 75b, respectively, are not directly conected to the recorder as in FIG. 1a These leads are applied to an adder 105, said adder providing across its output leads 107 a voltage equal to the sum of the voltages applied to the input leads 93 and 98. It is apparent that the voltage applied to the input leads 93 represents distance AC; i.e., the smallest distance between the wall of the housing 10 and the wall 31 of the bore hole, and the voltage applied to the input leads 98 represents distance KB; i.e., the largest distance between the wall of the housing 10 and the wall of the bore hole 32. Consequently, the sum of these two voltages obtained across the output leads 107 represents the diameter of the bore hole. We shall now compare the voltage across leads 83 representing the output of the rate meter 73 with the voltage across the leads 107. It has been determined: (a) That when a bore hole enlargement is encountered, the voltage across the leads 83 *decreases in intensity*. (b) When a bore hole enlargement is encountered, the voltage across the leads 107 *increases in intensity*.

By adding the above voltage on leads 83 and the voltage on leads 107, we obtain a resultant voltage appearing on leads 108 that represents the porosity of the formation and is substantially independent of the variation of the diameter of the bore hole. As shown in FIG. 1b, these two voltages obtained across the leads 83 and 107 are applied to an adder 106, and we obtain across it on leads 108 a voltage representing the porosity of the formation and substantially independent of the diameter of the bore hole. This voltage is recorded in form of a trace 109 on the moving photographic film 19. Also in the film I can record another voltage; for example, trace 89 can represent the orientation of the housing 10 with respect to the geographic north.

FIG. 6 shows an embodiment of my invention in which I determine the character of formation along various lateral distances from the axis of the bore hole. Referring now more particularly to this figure, there is schematically illustrated a drill hole 200 penetrating the formations to be investigated. An exploratory apparatus comprising a housing 201 is lowered into the bore hole by means of a cable 202. The cable is wound on drum 203. In order to determine the depth of the exploratory apparatus within the bore hole at any time, there is provided a measuring wheel 204 engaging the cable 202 above the top of the hole and adjusted to roll on the cable in such a manner that the number of revolutions of the wheel 204 corresponds to the amount of cable which has moved past the wheel in either direction. The wheel 204 is mounted on a shaft 205, and rotation of the wheel and, consequently of the shaft 205, is transmitted through a gear box 206 to another shaft 207 which is drivingly connected to take up spool 208 for moving a photographic film 209 from a feed spool 210 to the take-up spool 208.

The housing 201 of the exploratory apparatus comprises a large block of lead or tungsten 215 in which there is placed at the point S a source 216 of gamma rays such as $Co^{60}$ and a detector 217 at the point D. The lead or tungsten shield absorbs substantially all radiations emitted by the source 216 except the radiations directed within a cone 218, said cone comprising all directions from $SM_3$ to $SM_1$. The photons thus transmitted penetrate into the surrounding formations from which they are scattered, and a portion of the scattered photons directed along the path $C_1D$ interacts with a sodium iodide or cesium iodide crystal 220 and produces across the output terminals of the photomultiplier 221 a succession of pulses having magnitudes representing the energies of said photons. In order to prevent the detector D from being exposed to the heat of the well, it is sometimes necessary to place the detector in a vacuum or a Dewar flask as shown in FIG. 7. The Dewar flask is not shown in FIG. 6 for reasons of simplicity of illustration, but it must be understood that the arrangement of FIG. 7 is sometimes incorporated in the system of FIG. 6. The shield 215 surrounds the crystal 220 and the photomultiplier 221 except for a series of narrow elongated openings directed along the lines 222. In order to secure efficiency of detection, it is necessary to expose a large part of the large crystal 220 to the impinging gamma rays. If collimation is desired and a slot is provided in a surrounding shield, it is necessary to make the slot very narrow in order to achieve collimation along a very confined direction. If a large slot is provided as in FIG. 6c, then collimation will not be very restricted and the reception will be confined only to a relatively wide angle. If the slot is made very much narrower, as in FIG. 6a, then good collimation is provided, but only a very small portion of the crystal 220 is irradiated with gamma rays. By providing a multiplicity of slots as shown in FIG. 6b, I am able to achieve the advantages of directivity of FIG. 6a while still permitting a large portion of the crystal to participate in the detection of the rays.

The output of the photomultiplier 221 is connected through the amplifier 224 to the cable 202 and to the top of the hole where the signal is applied to pulse height selectors 230, 231, and 232; each of said pulse height selectors is characterized by a different pass band and adapted to selectively transmit a very narrow range of pulse heights. The output of the gates 230, 231, 232 are connected to rate meters 240, 241, 242, respectively, said rate meters having their outputs connected to galvanometer coils 250, 251, 252, respectively. To the galvanometer coils are attached suitable mirrors in a manner well known in the art which are adapted to reflect beams of light derived from a source 253, thereby effectively producing on the sensitive film 209 a record comprising three traces designated as 260, 261, 262, respectively, and representing the voltages derived from rate meters 241, 242, 243, respectively.

It is apparent that the beam of photons arriving at the crystal 220 along the path $C_1D$ comprises photons of various energies. Each of said photons is a secondary photon that resulted from Compton scattering in which the primary photon emitted by the source 216 collided with an electron positioned somewhere on the line $C_1D$.

Thus the photon that underwent a collision at the point $C_1$ produced a secondary scattered photon that has an energy $(E^1\gamma)_1$ determined by the scattering angle $\theta_1 = \sphericalangle MC_1D$, and the number of these scattered photons represents the density of the formation at the point of scattering $C_1$. The gate 230 has been so designed as to transmit only those pulses that correspond to photons having energy $(E^1\gamma)_1$. Thus the rate meter 240 produces a voltage having magnitude representing the density of the soil at the point $C_1$ and as the exploring housing 201 is moved in the hole we obtain by means of the galvanometer 250 a trace 260 representing the variation with density along a profile $P_1P_2$ distant from the hole by an amount $d_4$.

In a similar manner, the photon that underwent a collision at the point $C_2$ produced a secondary scattered photon of energy $(E^1\gamma)_2$ determined by the scattering angle $\theta_2 = \angle M_2C_2D$ and the number of scattered photons having this energy represents the density of soil at the point of scattering. The gate 231 is so designed as to transmit only the impulses that correspond to photons having energy $(E^1\lambda)_2$. Thus the rate meter 241 produces a voltage having magnitude representing the density of the soil at the point $C_2$ and as the exploring housing 201 is moved we obtain by means of the galvanometer mirror 251 a trace 261 representing the variation of density with depth along a profile $R_1R_2$ distant from the hole by an amount $d_5$.

It is apparent that in a similar manner we may obtain a log such as 262 representing the variation of the density with the depth along the profile $T_1T_1$ distant from the hole by an amount $d_6$.

Under certain conditions it is desirable to permit the detector D to measure very soft gamma rays, i.e., in the vicinity of 100 k.e.v., and the steel wall of the housing 201 will impede the efficient transmission of gamma rays of such low energy. The housing 201, however, must be able to resist the very great hydrostatic pressure that occurs at great depths in fluid-filled wells. In order to provide a housing capable of withstanding the very high hydrostatic external pressures (of the order of 15,000 pounds per square inch) and still permit the transmission of soft gamma rays, I have provided a special housing as illustrated in FIG. 8a. In this figure the instrument housing indicated by numeral 270 is made somewhat thicker than would normally be required to withstand the external hydrostatic pressure. In the vicinity of the region occupied by the detector D a large number of holes 271 are drilled. The thick-walled housing 270 is then pressed into a very thin-walled metallic tube 272, preferably made of very strong material having very high tensile strength such as K monel, Z nickel, beryllium copper, or high-grade steel. Although this tube is very thin, the extraordinary strength of such a construction is derived from the fact that the thin metallic member 272 when exposed to hydrostatic pressure is entirely in tension. The thick-walled tube 270 is sufficiently strong and thick to resist deformation and the thin outer member 272 behaves as a series of diaphragms, each diaphragm being in tension. The thickness for the material 272 is determined almost entirely by the size of the holes 271 and can be decreased almost ad infinitum by also decreasing the size of the holes. By suitable construction it is possible to make the material of 272 only a few thousandths of an inch thick, thus permitting the passage of very soft gamma rays into the interior of the housing and to the detector D.

I claim:

Apparatus for bore-hole logging comprising a unit adapted to be lowered into a bore hole containing a casing, to provide information concerning the character of formations adjoining said bore hole, said unit including at least one radiation source emitting nuclear rays outwardly from said unit, means operative to maintain said unit in an offset position relative to the axis of said bore hole, one side of said unit being thereby normally disposed closely adjacent the bore-hole casing, a pair of radiation-sensitive elements diametrically disposed in said unit, the first such element being positioned on the side of the unit normally adjacent said casing, means associated with each such element for developing electric pulses representative of radiation detected thereby and having magnitudes proportional to the energies of detected rays, a pair of transmission channels respectively fed by said pulse-developing means, each such channel comprising a low-pass gate network operative to transmit only pulses representative of detected radiation below a predetermined energy level, a rate meter for each such channel and fed thereby, operative to develop a D.-C. voltage representative of the repetition rate of the pulses transmitted by said channel, adder means fed by both of said rate meters operative to add together said D.-C. voltages and thus provide a resultant voltage whose variations as a function of the depth of said unit in said bore hole provide an indication of the bore-hole size at various depths, a third radiation-sensitive element in said unit, means associated therewith for producing electric pulses representative of radiation detected by said third element, said pulses having magnitudes proportional to the energies of the detected rays, a third transmission channel comprising a high-pass gate network operative to transmit only pulses representing radiation exceeding a predetermined energy level, a third rate meter fed by said third transmission channel operative to produce a D.-C. voltage representative of the repetition rate of pulses transmitted by said channel, and means for adding the D.-C. voltage derived from said third rate meter to the resultant voltage derived from said first-mentioned adder for deriving an output voltage representative of the character of the formations adjoining said bore hole wherein variations in the output voltage of said third rate meter resulting from changes in the lateral distance separating said logging unit from the walls of said bore hole are compensated for by oppositely sensed changes in the output voltage from said first-mentioned adder.

References Cited by the Examiner

UNITED STATES PATENTS

| | | | |
|---|---|---|---|
| 2,776,378 | 1/1957 | Youmans | 250—83.6 |
| 2,850,642 | 9/1958 | Seevers | 250—71.5 |
| 2,934,652 | 4/1960 | Caldwell et al. | 250—83.6 |
| 2,996,618 | 8/1961 | Goodman et al. | 250—83.6 X |
| 3,038,075 | 6/1962 | Youmans | 250—83.6 X |

RALPH G. NILSON, *Primary Examiner.*

ARCHIE BORCHELT, *Examiner.*